United States Patent
Carlson

(10) Patent No.: US 9,302,615 B2
(45) Date of Patent: Apr. 5, 2016

(54) DISABLED VEHICLE SAFETY APPARATUS

(71) Applicant: Patrick E. Carlson, Brunswick, OH (US)

(72) Inventor: Patrick E. Carlson, Brunswick, OH (US)

(73) Assignee: Black Bart, Inc., Brunswick ( * ) Notice: Subject to any disclaimer, the term of this patent is extended or adjusted under 35 U.S.C. 154(b) by 194 days.

(21) Appl. No.: 13/907,164

(22) Filed: May 31, 2013

(65) Prior Publication Data

US 2014/0352601 A1  Dec. 4, 2014

(51) Int. Cl.
*B60Q 1/52* (2006.01)
*B60J 11/04* (2006.01)
*B60P 7/08* (2006.01)

(52) U.S. Cl.
CPC . *B60Q 1/52* (2013.01); *B60J 11/04* (2013.01); *B60P 7/0876* (2013.01)

(58) Field of Classification Search
CPC ......... B60J 11/04; B60Q 1/2615; B60Q 1/52; B60P 7/08; B60P 7/0876
USPC ................. 116/28 R, 30, 63 P, 202; 150/166; 296/100.15, 100.16, 136.1, 136.11, 296/136.12, 136.13; 40/591, 592
See application file for complete search history.

(56) References Cited

U.S. PATENT DOCUMENTS

| | | | | |
|---|---|---|---|---|
| 2,675,545 A * | 4/1954 | Wolper | ......................... | 340/473 |
| 4,080,924 A * | 3/1978 | LeClaire | ...................... | 116/28 R |
| 4,827,997 A * | 5/1989 | Rolan | ........................... | 150/166 |
| 5,050,924 A * | 9/1991 | Hansen | .................... | 296/100.15 |
| 5,533,287 A * | 7/1996 | Cole | ............................... | 40/591 |
| 5,769,526 A * | 6/1998 | Shaffer | ........................ | 362/459 |
| 5,954,076 A * | 9/1999 | McGinnis | ............... | E04H 15/06 135/88.06 |
| 6,398,287 B1 * | 6/2002 | Smith et al. | ............. | 296/100.01 |
| 6,406,169 B1 * | 6/2002 | Munsey | ................... | B60Q 3/06 362/485 |
| 6,650,283 B2 * | 11/2003 | Brydges et al. | ........... | 342/357.36 |
| 6,783,267 B1 * | 8/2004 | Yeoman et al. | ...... | B60Q 3/0279 362/394 |
| 7,021,235 B1 * | 4/2006 | Nikjewicz-Larsen | ........ | 114/361 |
| 7,075,481 B2 * | 7/2006 | Huston et al. | ............. | 342/357.48 |
| 7,290,826 B2 * | 11/2007 | Dempsey | ................. | 296/136.13 |
| 7,690,821 B2 * | 4/2010 | Ayotte et al. | .................. | 362/396 |
| 8,267,035 B2 * | 9/2012 | Hamilton | .................... | 116/28 R |
| 8,439,422 B2 * | 5/2013 | Ricks, Jr. | ........................ | 296/98 |
| 8,479,787 B1 * | 7/2013 | Sahadeo et al. | ............... | 150/154 |
| 2001/0038226 A1 * | 11/2001 | Hoenack | ...................... | 296/136 |
| 2002/0098052 A1 * | 7/2002 | Liu | ................................. | 410/97 |

(Continued)

FOREIGN PATENT DOCUMENTS

DE   20018870 U1 *  6/2001  ............... B60Q 1/52
WO   WO 2014193414 A1 * 12/2014  ............... B60J 11/04

*Primary Examiner* — R. A. Smith
(74) *Attorney, Agent, or Firm* — Tucker Ellis, LLP

(57) ABSTRACT

A disabled vehicle safety apparatus is disclosed herein. The apparatus is utilized to prevent harm to a disabled vehicle or driver located on a roadway or the side of a road. The apparatus is configured to be collapsed and folded for easy transportation. The apparatus comprises a body and a perimeter that are comprised of lightweight reflective material(s). The apparatus includes elastic cording and a plurality of apertures. The elastic cording is located throughout the perimeter of the apparatus, wherein the elastic cording is operative to tighten and loosen the perimeter. The plurality of apertures is located along the perimeter, wherein the elastic cording is accessible through the plurality of apertures. The apparatus includes at least one removably attachable component that may be operative to be secured to the body and/or the perimeter, such as a GPS component, via the elastic cording.

20 Claims, 6 Drawing Sheets

(56) References Cited

U.S. PATENT DOCUMENTS

| | | | |
|---|---|---|---|
| 2004/0108746 A1* | 6/2004 | Elliott | B60J 7/104 296/100.16 |
| 2006/0273615 A1* | 12/2006 | Ricks | 296/100.16 |
| 2007/0046063 A1* | 3/2007 | Dempsey | 296/136.1 |
| 2010/0123331 A1* | 5/2010 | Buelna et al. | 296/100.15 |
| 2011/0096538 A1* | 4/2011 | Koch et al. | F21L 4/005 362/205 |
| 2012/0318416 A1* | 12/2012 | Siciliano | 150/166 |
| 2014/0056014 A1* | 2/2014 | Heaman et al. | B60Q 3/06 362/485 |
| 2014/0104057 A1* | 4/2014 | Futrell | 340/473 |
| 2014/0198510 A1* | 7/2014 | Law et al. | B60Q 3/065 362/485 |

* cited by examiner

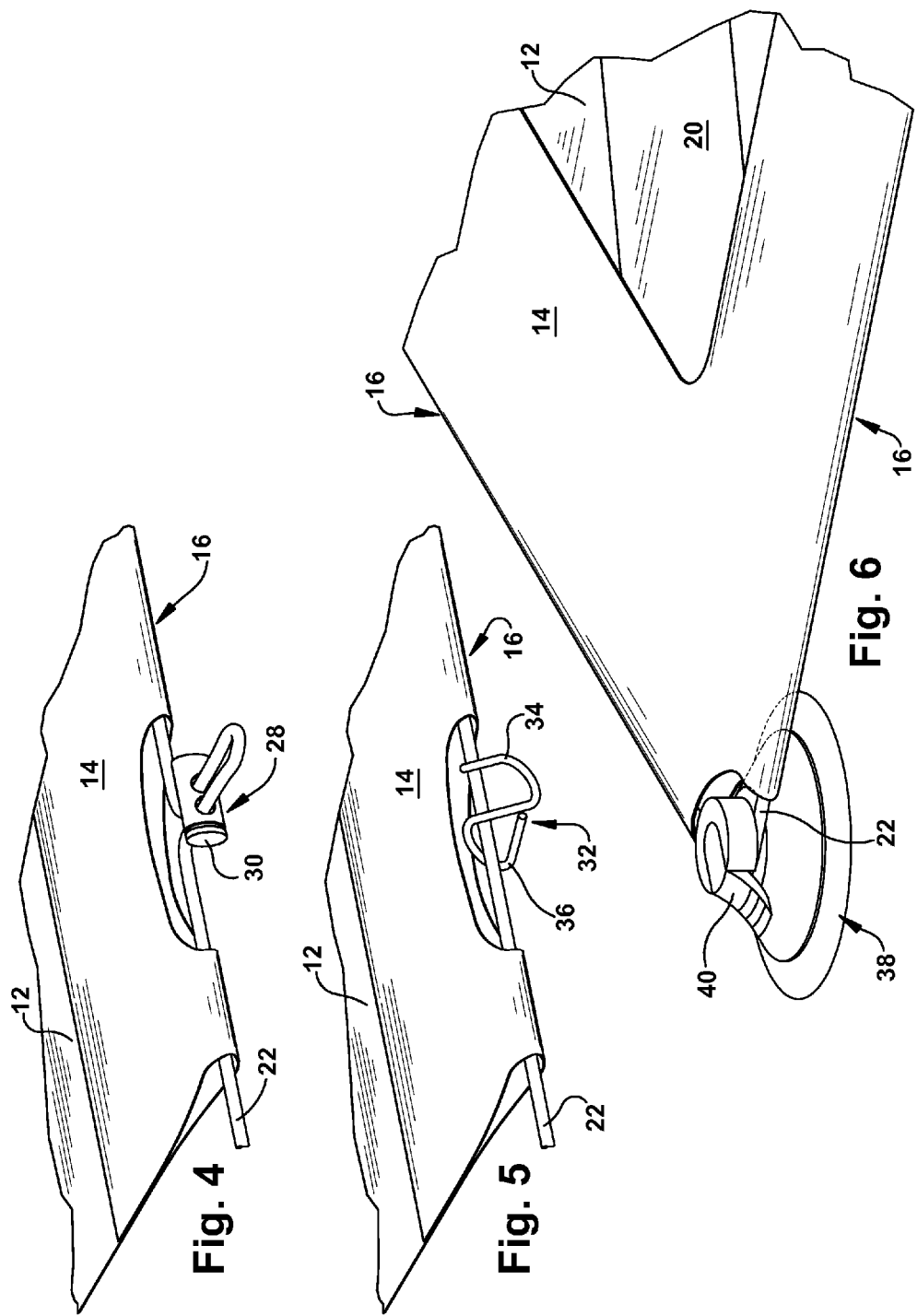

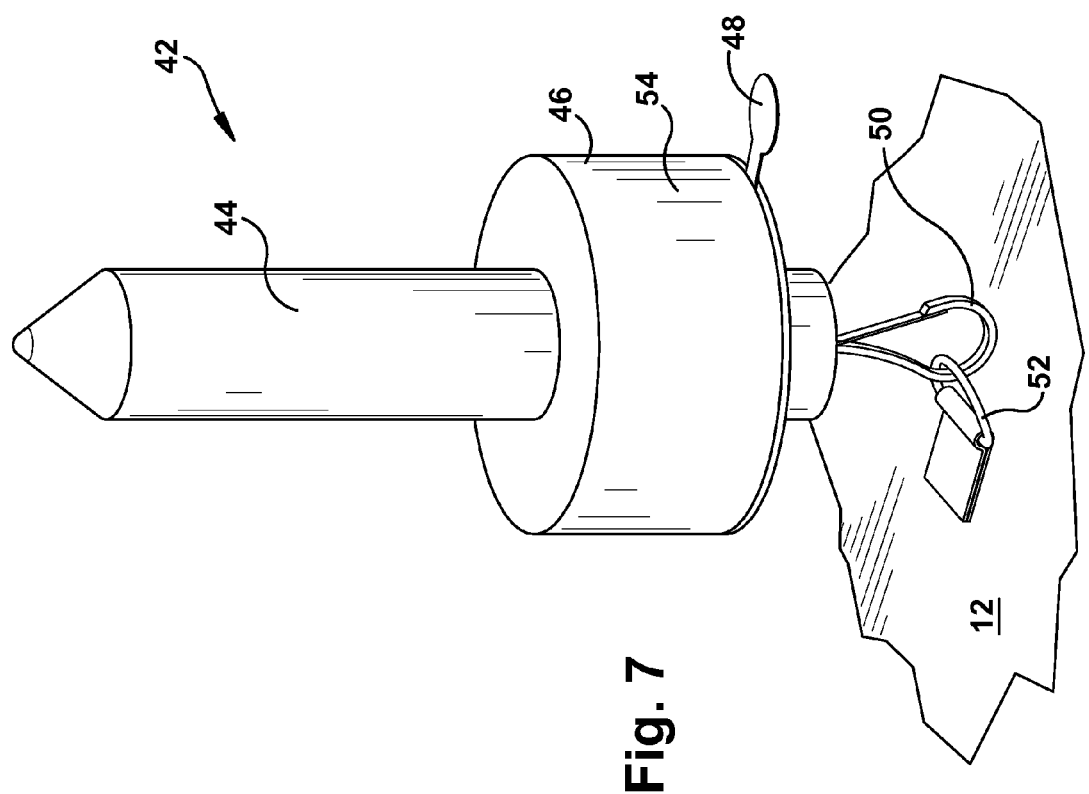

DISABLED VEHICLE SAFETY APPARATUS

FIELD OF INVENTION

The present invention generally relates to a disabled vehicle safety apparatus and, more particularly, to a removable, securable and portable vehicle safety cover.

BACKGROUND

Typically, many motor vehicle operators often carry emergency roadside kits in their vehicles in case the motorist is in an accident, the vehicle becomes disabled, or in the event that other emergencies occur, such as bad storms, for example. A typical roadside kit may contain items commonly needed during an emergency, such as flares and the like to let other motorists know that the vehicle is disabled.

In other situations, motor vehicles sometimes have problems when they are moving on roads. Often, disabled vehicles may stop on the road, whereby it is very important for the driver of the disabled vehicle to be able to provide an adequate signal to oncoming traffic so that other drivers may take precautionary measures to evade the problematic vehicle on the road. When vehicles stop on highways where other vehicles are moving at extremely high speed, the provision of adequate warning signals become key to avoid unnecessary and catastrophic accidents.

Drivers may often have to stop by the side of the road, for example, to change a tire. When the driver gets out of the car, the driver subjects himself to the danger of being hit by passing cars. Typically, a driver will activate his installed emergency hazard warning lights, which cause the standard turn signal lights, taillights and headlights, or other appropriate lights, which are located on the lower portion of the vehicle. These emergency hazard lights will typically blink on and off in order to inform other drivers that the driver has stopped. Depending on lighting conditions, however, it is sometimes difficult for other drivers to see the warning lights, thereby subjecting the driver of the disabled vehicle to risk. This may be problematic because approaching vehicles cannot see the flashing taillights until they are quite close to the disabled vehicle.

Flares are another conventional warning device for use with disabled motor vehicles. Flares have an advantage of being easily visible at night. However, a motorist who drives past one or more flares may be temporarily blinded by their brightness, thereby endangering the motorist and people in the vicinity of the motorist. The flare is particularly dangerous to use where an automobile collision causes a spillage of gasoline on a roadway. Among other undesirable aspects of the flare is that a person charged with igniting the flare risks being burned and having their clothing burned. Flares may also release noxious fumes when they burn.

In addition, many people may be uncomfortable using flares, either because they do not know how to use them properly or because they are afraid they will be burned. As a result, a stranded motorist might be limited to using the installed emergency hazard lights to warn other motorists or to assist emergency response personnel in locating the vehicle.

In the boating industry, flares are typically used to indicate a vessel in peril. The use of a flare on a gasoline powered boat, however, is very dangerous since a boat in peril is not moving, thus the opportunity for gasoline vapor accumulation may be high. Once a flare is lit, the flare must be held over the side of the boat to prevent the hot molten materials from entering the vessel. Further, unlike a road side situation, a flare cannot be set down safely within a boat.

Another one of the most commonly used hazard markers is the orange cone. The orange cones may sometimes not readily be seen outside of an immediate area where the cone is placed, particularly in poor weather conditions. The cones may also frequently be destroyed or badly damaged when inadvertently struck by a motor vehicle.

These conventional warning devices have several disadvantages. For example, some conventional warning devices are so small in size that the reflective surfaces bearing the warning signals on the conventional warning devices are barely noticeable so that drivers of incoming traffic may not notice the disabled vehicle.

Another disadvantage is that drivers may need to or be required to erect and remove the warning sign at a distance from the vehicle. Since the warning sign may need to be erected at a distance from the disabled vehicle, there must be a substantial time gap between stopping of the disabled vehicle and complete erection of the warning sign. This may create danger to the driver of the disabled vehicle.

Yet another disadvantage is that it may be very difficult for the warning signs to be used effectively when weather conditions are poor. For example, since the size of the warning sign is usually small, when the weather condition is poor, drivers of the incoming traffic may not notice the sign. In addition, since the warning sign is separately erected at a distance from the disabled vehicle, it may easily be toppled when the warning sign is used in poor weather condition. Therefore, a need exists for a highly visible warning device that may be conveniently stored in a typical vehicle.

SUMMARY

A disabled vehicle safety apparatus is disclosed herein. The apparatus may be utilized to prevent harm to a disabled vehicle or the driver of the disabled vehicle that may be located on a roadway or on the side of a road. The apparatus comprises a body including a perimeter, wherein the perimeter may be located around an outer edge of the body, and wherein the body and the perimeter may both be configured to be collapsed and folded for easy transportation. The apparatus also includes elastic cording and a plurality of apertures. The elastic cording may be located throughout the perimeter of the apparatus, wherein the elastic cording may be operative to tighten and loosen the perimeter. The plurality of apertures may be located along the perimeter, wherein the elastic cording may be accessible through the plurality of apertures.

The apparatus may also include at least one removably attachable component that may be operative to be secured to the body and/or the perimeter, via the elastic cording. The at least one component may be independently removable from the apparatus. The at least one component may be a toggle component, a hook component, a suction component, a lighting component and/or a GPS component.

The disabled vehicle safety apparatus may further include an internal pattern located within the perimeter of the body. The internal pattern may include elastic cording and a plurality of apertures located along the lengths of the internal pattern. The internal pattern may be of any appropriate shape, size, type or configuration, such as in the approximate shape of the letter "X". The body may be fabricated from a polyethylene material, such as DuPont Tyvek®. The body and the perimeter may be fabricated from reflective materials. The apparatus may further comprise a plurality of perforated flaps located throughout the body of the apparatus.

BRIEF DESCRIPTION OF THE DRAWINGS

Objects and advantages together with the operation of the invention may be better understood by reference to the following detailed description taken in connection with the following illustrations, wherein:

FIG. 4 illustrates a perspective view of a toggle component in use with the disabled vehicle safety apparatus.

FIG. 5 illustrates a perspective view of a hook component in use with the disabled vehicle safety apparatus.

FIG. 6 illustrates a perspective view of a suction component in use with the disabled vehicle safety apparatus.

FIG. 7 illustrates a perspective view of a lighting component in use with a disabled vehicle safety apparatus.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention. Additionally, as used herein, the term "exemplary" is intended to mean serving as an illustration or example of something, and is not intended to indicate a preference.

A disabled vehicle safety apparatus 10 (the "apparatus 10") is illustrated in FIGS. 1-8. The disabled vehicle safety apparatus 10 may be a removable, securable and portable vehicle safety cover. The apparatus 10 may be used with any appropriate type of vehicle, such as automobiles, boats, snow mobiles, motorcycles, etc. The apparatus 10 may guide emergency personal to a disabled vehicle or passing motorists away from harm or peril.

Figure 8:
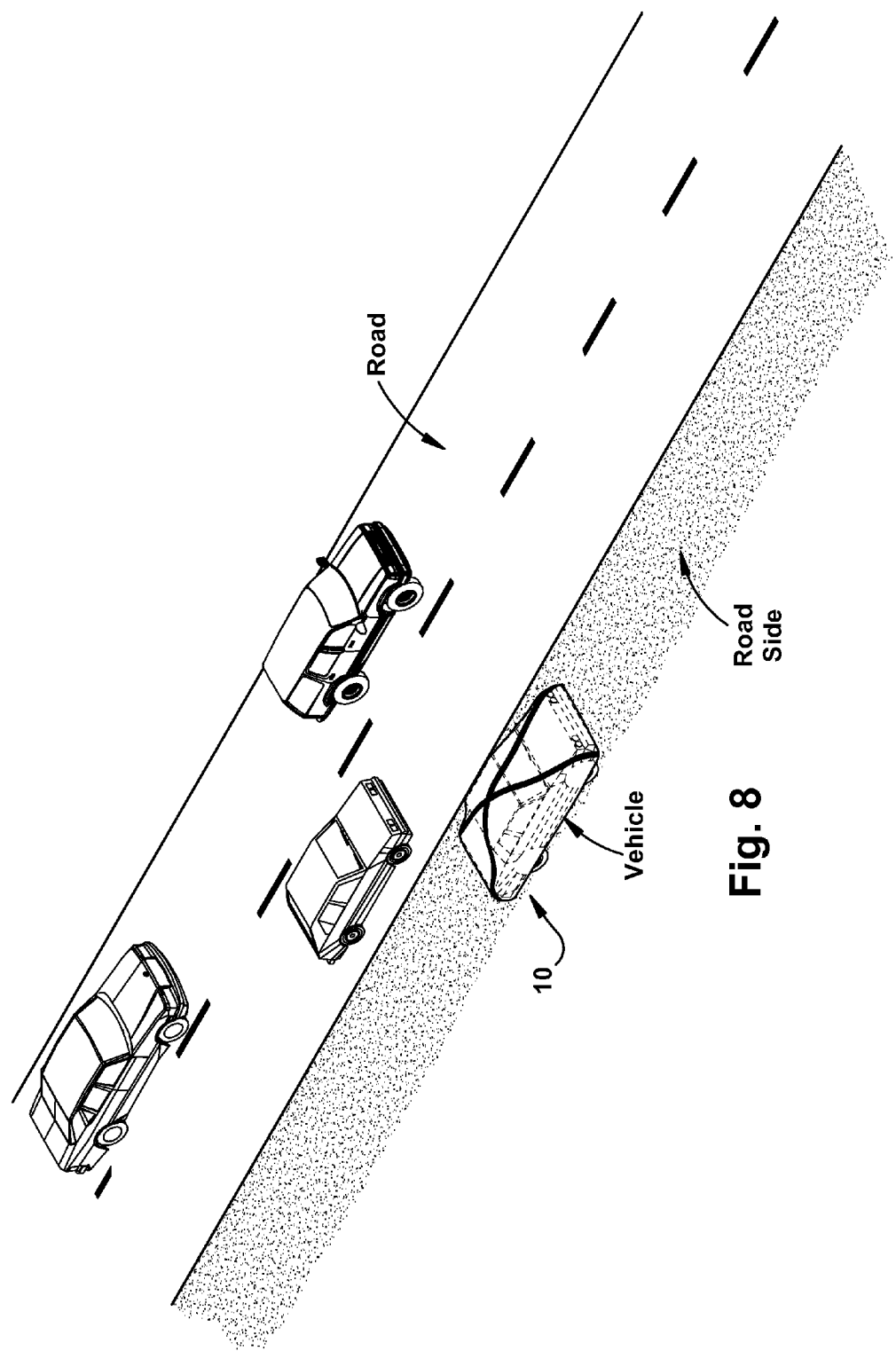
FIG. 8 illustrates a perspective view of an exemplary embodiment of the disabled vehicle safety apparatus of FIG. 1.

The disabled vehicle safety apparatus 10 may be utilized for any appropriate purpose. For example, the apparatus 10 may be utilized to prevent harm to a disabled vehicle or the driver of the disabled vehicle that may be located on a roadway or on the side of a road, as shown in FIG. 8. The disabled vehicle safety apparatus 10 may be available for all new types of transportation as well as used transportation. The apparatus 10 may be sold or automatically included with new motorized transportation purchases, such as with automobiles, boats, snow mobiles, motorcycles, etc., as well as independent aftermarket motorized transportation retailers.

The apparatus 10 may mark areas that need assistance related to emergency or non-emergency assistance or needs. The apparatus 10 may also satisfy distance and safety study results (i.e., such as size and candlelight power requirements among various types of reflective tape and material). In addition, the apparatus 10 may be U.S. Department of Transportation (DOT) compliant or similarly compliant with any necessary local, state and federal regulations. Additionally, the apparatus 10 may be compliant with any regulations relating to the American Disabilities Act (ADA).

Figure 2:
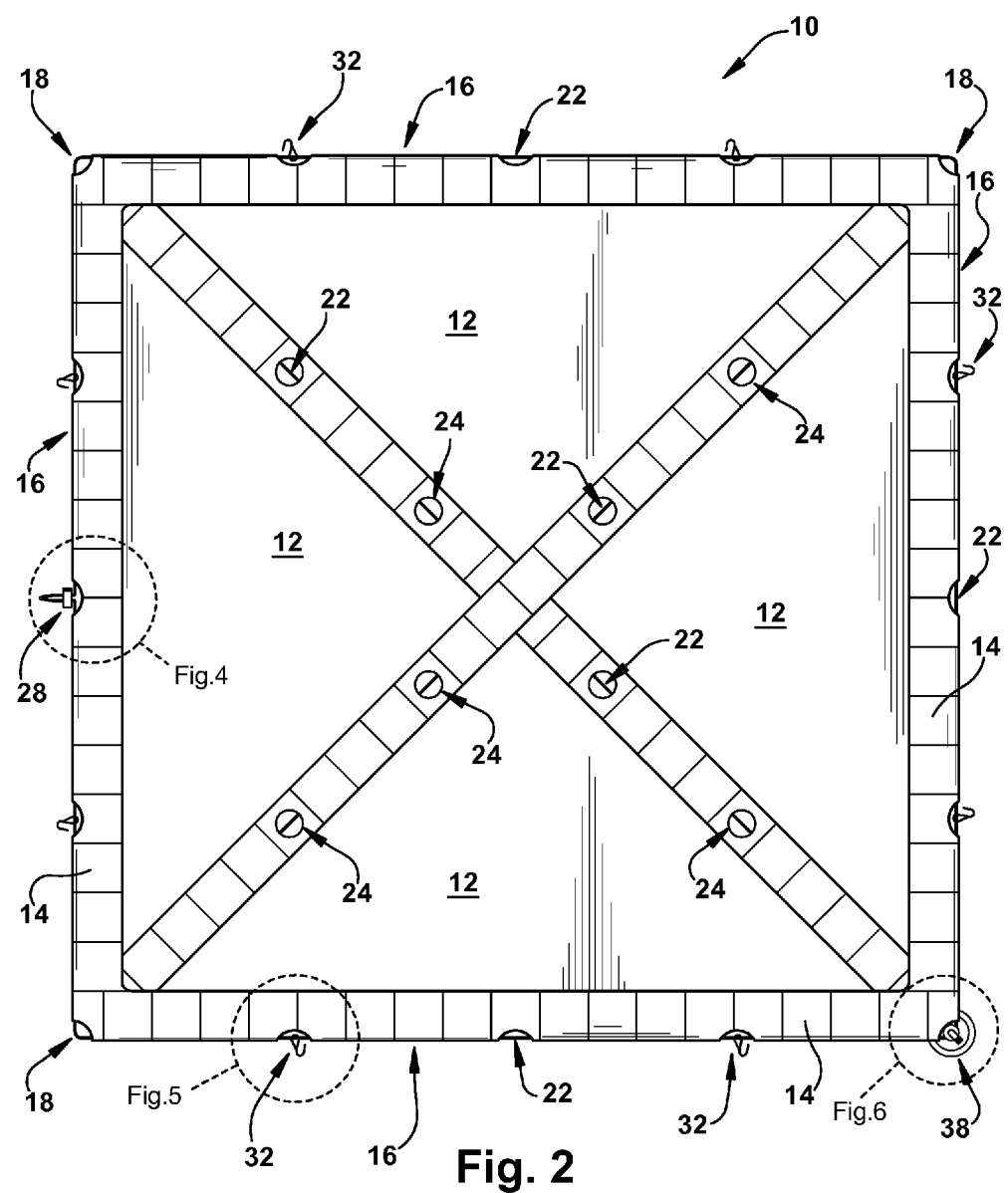
FIG. 2 illustrates an embodiment of a top view of the disabled vehicle safety apparatus.
Figure 3:
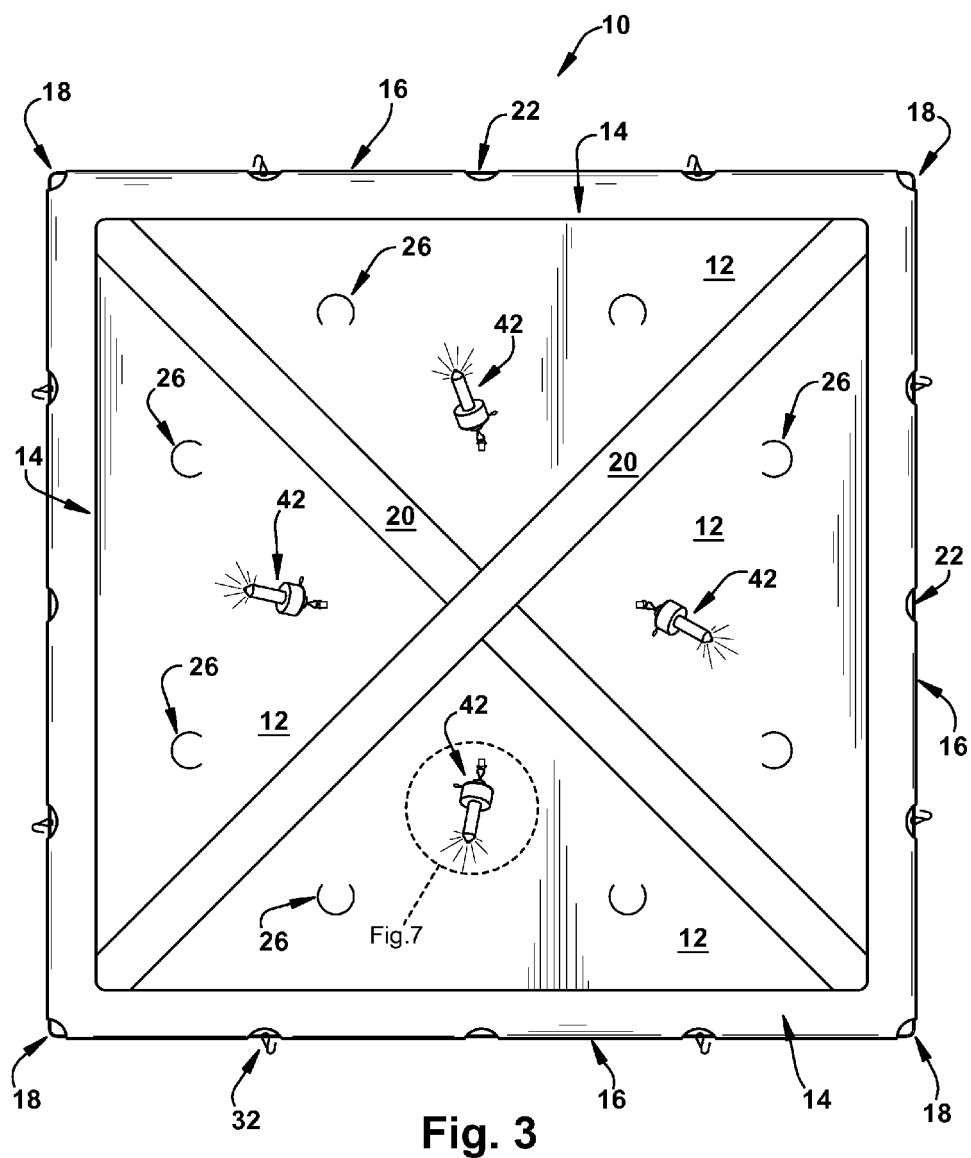
FIG. 3 illustrates an exemplary embodiment of a top view of the disabled vehicle safety apparatus.

The disabled vehicle safety apparatus 10 may be of any appropriate shape, size, type or configuration. In an exemplary embodiment, the apparatus 10 may be of a generally square or rectangular shape, as best shown in FIGS. 2 and 3. Alternatively, the apparatus 10 may be of a generally circular, triangular or polygonal shape. The apparatus 10 may be of a generally flat configuration, as shown in FIGS. 4-6. The disabled vehicle safety apparatus 10 may be of varying square footage depending upon the vehicle it is to be utilized with. In addition, the apparatus 10 may be adjustable to varying vehicles, as will be described below.

Figure 1:
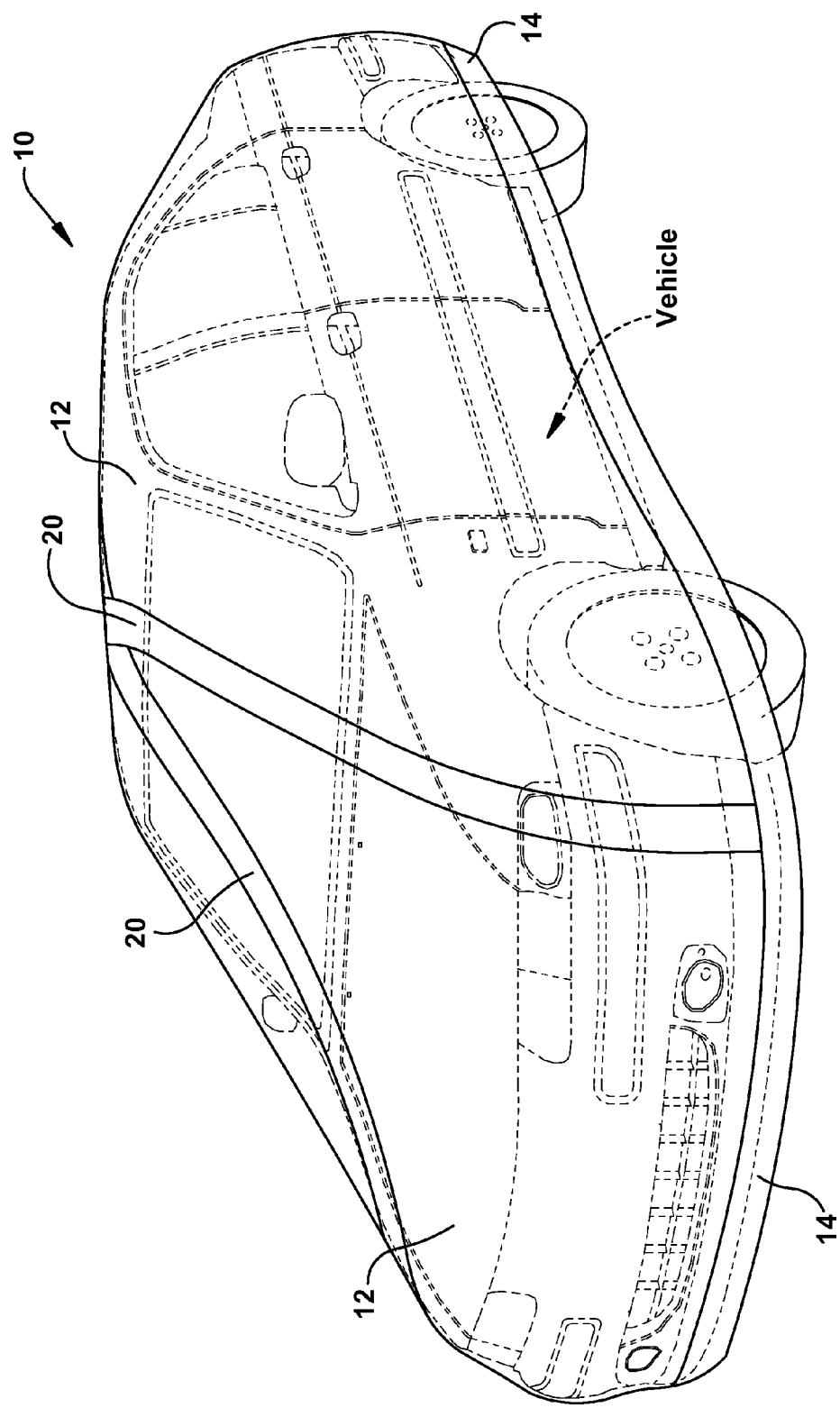
FIG. 1 illustrates an exemplary embodiment of a perspective view of a disabled vehicle safety apparatus in use with a vehicle.

The apparatus 10 may also be of any appropriate size, such as of a size similar to that of a sedan motor vehicle, for example and as illustrated in FIGS. 1 and 8, or of a size corresponding to a motorcycle, truck, snowmobile, etc. As an alternative, the apparatus 10 may be of a size smaller than the motor vehicle, whereby it may be of a size that may cover only a portion of the vehicle, boat or the like such as a top portion or a rear portion of the vehicle, for example.

The disabled vehicle safety apparatus 10 may be fabricated from any appropriate material(s) and color(s). In an exemplary embodiment, the apparatus 10 may be fabricated from a polyethylene like material, particularly a high-density polyethylene, such as DuPont's Tyvek® material. Tyvek® by DuPont is a brand of flashspun high-density polyethylene fibers, a synthetic material. The material is very strong, whereby it may be difficult to tear but can easily be cut with scissors or a knife. In addition, water vapor may pass through Tyvek®, as it is highly breathable, but liquid water may not. The material is exceptionally breathable, strong, durable and long lasting. The material is also very lightweight, which lends itself to easy portability.

In an alternative embodiment, in emergency situations the apparatus 10 may be utilized as a blanket, makeshift tent and/or a lean to. For example, recreational climbers, backpackers, hikers and/or campers may take the apparatus 10 with them on their excursion(s) and may utilize the apparatus 10 as mentioned in the case of an emergency. Similarly, the apparatus 10 may also be utilized with small plans or helicopters, either to be used in the traditional manner described herein or to use as a blanket and the like.

In addition, the apparatus 10 may be brightly colored with a plurality of reflective portions. The disabled vehicle safety apparatus 10 may be collapsible or foldable whereby it may be conveniently stored and may be easily constructed and mounted on the vehicle. Moreover, the ability of the apparatus 10 to be foldable may allow the apparatus 10 to be adjusted to fit to different sizes and types of vehicles.

With reference to FIGS. 1-3, the disabled vehicle safety apparatus 10 may comprise a body 12 and a perimeter 14. As discussed above, the apparatus 10 may be of any appropriate shape. For purposes of this exemplary embodiment, the apparatus 10 will be described as a generally square or rectangular shape, but it is to be understood that the apparatus 10 may be of any appropriate shape and should not be limited to a square or rectangular shape as described herein. The body 12 may be of any appropriate shape or size, such as a generally square, rectangular, circular, triangular or polygonal shape.

The perimeter 14 may be of any shape or size, such as of an approximately and correspondingly similar shape and size as that of the body 12, as shown in FIGS. 2 and 3. For example, for purposes of this exemplary embodiment, the perimeter 14 may be of a generally square or rectangular shape, whereby the perimeter 14 may comprise four edges 16 and four corners 18, as shown in FIGS. 2 and 3.

The perimeter 14 of the apparatus 10 may extend longitudinally along an edge 16 of each side of the body 12. The perimeter 14 may be fabricated out of any appropriate material. In an exemplary embodiment, the perimeter 14 may be fabricated from a reflective material or tape. The reflective material may comprise a retrorefrlector material, such as reflective tape, for example.

A retroreflector is a device or surface that reflects light back to its source with a minimum of scattering. Retroreflection is often used on road surfaces, road signs, vehicles, and clothing (i.e., such as large parts of the surface of special safety clothing). When the headlights of a vehicle illuminate a retroreflective surface, the reflected light is directed towards the vehicle and its driver (rather than in all directions as with diffuse reflection), so as to better warn the driver of the vehicle that there is something up ahead.

Part of the surface of the apparatus 10, such as the perimeter 14, may have retroreflective tape or stripes. This way the perimeter 14 stripes may become much more visible in the dark for observers near a light source, such as the driver of a vehicle with its headlights on. The pattern of the retroreflecting stripes may also help to distinguish between objects and people. Area reflective fabric is one of the most effective ways of outlining an object, whereby drivers may be able to easily distinguish an objects shape at night.

One way to customize the look of the apparatus 10 is to utilize adhesive tape along the perimeter 14. Alternatively, the perimeter 14 may be comprised of a material of or similar to adhesive tape. The perimeter 14 may be secured to the body 12 of the apparatus 10 by any appropriate means. In an exemplary embodiment, the perimeter 14 material may be sewn onto the body 12 material. Alternatively, the perimeter 14 material may be glued, taped, ironed on, or secured by any other appropriate means to secure the perimeter 14 to the body 12 material of the apparatus 10. As another alternative, the perimeter 14 may be integrally formed with the body 12 of the apparatus 10.

The reflective tape or material may be of any appropriate shape, size, type or configuration. The reflective tape or material may comprise 3M™ Scotchlite™ reflective products and the like. The width of the reflective tape or material may be determined by its reflection properties as it may relate to distance and safety study results. The 3M™ Scotchlite™ reflective tape or material may help enhance the visibility of the apparatus 10 in nighttime or low-light conditions when illuminated by a light source, such as headlights, by returning the light back toward the original source and reaching the automobile driver's eye. Fluorescent color fabrics may also be utilized to enhance daytime and low-light visibility. Scotchlite reflective material fabrics are comprised of wide angle, exposed retroreflective lenses.

With reference to FIGS. 1-3 and 8, the body 12 may also comprise a specific internal pattern 20 that may be similarly fabricated from the reflective tape or any other appropriately reflective material. In an exemplary embodiment, the internal pattern 20 may generally be of an "X" shape or pattern 20. It is to be understood, however, that the internal pattern 20 may be of any desired shape or figure, such as a circle, square, SOS, and the like, and should not be limited to that described herein.

For greater visibility during the daytime, very bright colors may be used for the main body 12 of the apparatus 10, such as by means of fluorescent material. In an exemplary embodiment, a surface area of the body 12 may include colors such as orange, yellow, white, or as desired. Reflective and non-reflective widths, patterns, and colors of the apparatus 10 may vary. Specific internal patterns 20 of designs may also be considered for colorblind individuals. As an alternative, the surface area of the body 12 may include a three dot, three dash, three dot (i.e., SOS) image or a large "SOS" image.

As shown in FIGS. 2-6, the disabled vehicle safety apparatus 10 may include elastic cording 22. With reference to FIGS. 4-6, the edges 16 of the perimeter 14 may be folded over and sewn closed to encase the elastic cording 22. The elastic cording 22 may run throughout the total perimeter 14, as well as the internal pattern 20, such as the diagonal X corner to corner pattern 20, or any other appropriate internal pattern 20 on the body 12.

The elastic cording 22 may be available and visible at different points in the areas of the desired internal pattern 20. In an exemplary embodiment, the elastic cording 22 may be visible and available at apertures 24 located along the edges 16 of the apparatus 10 and along the internal pattern 20, as shown in FIG. 2. The elastic cording 22 may also be available and visible at apertures 24 along the X pattern of the apparatus 10. The purpose of such aperture 24 access may be for attachment places for various removably attachable components, as will be discussed below.

The body 12 of the disabled vehicle safety apparatus 10 may include a plurality of perforated flaps 26, as shown in FIG. 3. The body 12 may include any appropriate number of perforated flaps 26. The perforated flaps 26 may be of any appropriate shape, size or type. The number and size of the perforated flaps 26 may be dependent on the square footage of the particular apparatus 10. In an exemplary embodiment, the perforated flaps 26 may be of a generally semi-circular shape. The flaps 26 may allow for the apparatus 10 to be able to evacuate air from beneath the apparatus 10, whereby the apparatus 10 may remain in a closer relationship to the vehicle, so to reduce the possibilities of the apparatus 10 parachuting away from the vehicle.

The disabled vehicle safety apparatus 10 may include any number and types of removably attachable devices or components. In an exemplary embodiment, the apparatus 10 may include at least one cord lock or toggle component 28, at least one hook component 32, at least one suction component 38, at least one lighting component 42, and the like. With reference to FIGS. 2 and 4, the apparatus 10 may include a plurality of cord locks or toggle components 28. The toggle components 28 may be of any appropriate shape, size, type or configuration.

The toggle components 28 may attach to the elastic cording 22 and may tighten without the use of knots. The toggle components 28 may consist generally of three parts: a barrel, a toggle (plunger), and a spring. Squeezed together, tension is released and the toggle component 28 may move freely up and down the elastic cording 22. Released, the tension may be engaged and the toggle component 28 may stay in place. The toggle components 28 may be used to retain one or more of the elastic cording 22 segments in a tightened condition and to release such cord segments when desired.

In an exemplary embodiment, the toggle components 28 may include a push button 30 to operate the toggle component 28, whereby the toggle component 28 may cinch the elastic cording 22 to its desired length or tension in order to adequately secure the apparatus 10 on the vehicle. The toggle components 28 may be utilized to regulate cording 22 usage and to adjust to tighten the edges 16 and surface of the apparatus 10 and to act as a noose to hold various other removably attachable components.

With reference to FIGS. 2, 3 and 5, the apparatus 10 may include a plurality of hook components 32 for further securing the apparatus 10 to the vehicle. The hook components 32 may be of any appropriate shape, size, type or configuration. In an exemplary embodiment, the hook components 32 may be of a generally open hook 34 configuration, whereby one end may be closed 36 and one end may be open 34. The hook components 32 may be utilized to aid in securing the apparatus 10 to the vehicle. For example, the hook components 32 may be utilized to hook onto various parts of the disable vehicle, such as the door handles, vehicle hood, and/or at various places under the vehicle, and the like.

With reference to FIGS. 2 and 6, the disabled vehicle safety apparatus may include a plurality of vacuum or suction components 38. The vacuum or suction components 38 may be of any appropriate shape, size, type or configuration. In an exemplary embodiment, the suction components 38 may be utilized as anchors, whereby the suction components 38 may attach and secure the four corners 18 of the apparatus 10 to the hood, doors, roof, window, trunk or other surface areas of the vehicle. There may be additional places on the perimeter 14 or within the body 12 of the disabled vehicle safety apparatus 10 to add additional suction components 38 as needed, or desired for your particular coverage area. The number of suction components 38 used may also vary as to individual comfort and security levels.

Any appropriate type of vacuum or suction components 38 may be utilized. The suction components 38 may be of any appropriate shape, size, type or configuration. The suction components 38 may be fabricated out of any appropriate material, such as rubber, vinyl, silicone, urethane, or a variety of polymer blends for specific applications that require certain characteristics, such as oil-resistant, non-marking, high heat, abrasion resistant and the like.

In an exemplary embodiment, the suction components 38 may comprise a flat type vacuum suction cup, which may be configured to handle flat or slightly curved surfaces, such as a vehicle. These types of suction components 38 may attach quickly due to the small volume of air to be evacuated. The suction components 38 may include a lever or tab 40 that may easily be lifted and closed to actuate the suction component 38.

The suction components 38 may be removably positionable and may be particularly adapted for a vehicle windshield, windows, and other smooth surfaces. The suction components 38 may be utilized for attaching the apparatus 10 at any selected location on the desired surface of the vehicle. The suction components 38 may include a vacuum breaking mechanism, which may be engaged by a spring-loaded, thumb-actuated projection 40, which may simultaneously break the vacuum in the suction component 38 so as to enable the suction component 38 to be easily removed without wrenching.

With reference to FIGS. 3 and 7, the disabled vehicle safety apparatus may include a plurality of lighting components 42. The lighting components 42 may be of any appropriate shape, size, type or configuration. Emergency flashing lights may play a vital role at hazard and accident scenes. The lighting components 42 may alert casual passersby and emergency personnel alike to the situation at hand. This in turn may promote safety and efficiency at the scene of the emergency and may help to mitigate any damage that may have been done.

The lighting component 42 may utilize any appropriate type(s) of lighting technology or bulbs 44. For example the lighting component 42 may utilize light emitting diode (LED) technology. The lighting components 42 may be high intensity directional light emitting diodes. LED bulbs 44 typically last far longer than traditional strobe or halogen bulbs, and in many cases, they never need replacing. Moreover, LED bulbs 44 shine at a 360-degree radius and may be visible from great distances.

The lighting component 42 may also operate a variety of flashing light patterns and may be of any appropriate color. The lighting components 42 may operate a flashing SOS pattern in Morse code during an emergency situation. As shown in FIG. 7, the lighting components 42 may comprise a tab pull strip 48, whereby when the strip 48 is pulled; the lighting component 42 is activated via a battery 46. This may help save the battery 46 from deterioration before use and only operating the battery 46 of the lighting component 42 when needed.

With further reference to FIG. 7, the lighting components 42 may include a clip 50 attachment. The clips 50 may be utilized to removably secure the lighting components 42 to the apparatus 10. The apparatus 10 may include hooks 52 secured onto the apparatus 10 whereby various components may be secured. Alternatively, the lighting components 42 may be secured to the elastic cording 22 via the clips 50.

The disabled vehicle safety apparatus 10 may also include a Global Positioning System (GPS) component 54, as shown in FIG. 7. The GPS component 54 may be any appropriate type of component, such as a GPS receiver or the like. The GPS component 54 may provide data and various related identifying location information. The GPS component 54 may operate in conjunction with any appropriate data sending and receiving components and systems. For example, the GPS component 54 may communicate with satellites, Wi-Fi networks, or may determine location data from any other data sources from the local environment that may communicate the appropriate data.

The GPS component 54 may be activated by any appropriate means. For example, the GPS component 54 may be activated by pushing a button or by removing the pull tab 48 strip for the lighting component 42 for battery 46 activation of the lighting component 42. This action may also activate the GPS component 54. The GPS component 54 may be a separate component or may be included with one of the lighting components 42. For example, the GPS component 54 may be integral with one or more of the lighting components 42. Alternatively, the GPS component 54 may be a separate component that may also be removably secured or attached to the apparatus 10 via one of the apertures 24, such that the GPS component 54 may be secured to the cording 22 via a clip 50.

Although the embodiments of the present invention have been illustrated in the accompanying drawings and described in the foregoing detailed description, it is to be understood that the present invention is not to be limited to the embodiments disclosed, but that the invention described herein is capable of numerous rearrangements, modifications and substitutions without departing from the scope of the claims hereafter.

Having thus described the invention, the following is claimed:

1. Apparatus comprising:
    a body including a perimeter located around an outer edge of the body, wherein the body and the perimeter are both configured to be collapsed and folded;
    elastic cording that is located throughout the perimeter of the apparatus, wherein the elastic cording is operative to tighten and loosen the perimeter;
    a plurality of apertures located along the perimeter, wherein the elastic cording is accessible through the plurality of apertures; and at least one removably attachable component that is operative to be secured to the body or the perimeter, wherein the at least one removably attachable component comprises a GPS component that is integrated with a lighting component, wherein the lighting component is configured to operate a flashing SOS pattern in Morse code.

2. The apparatus according to claim 1, wherein the at least one component is independently removable from the apparatus.

3. The apparatus according to claim 2, further comprising an internal pattern located within the perimeter of the body.

4. The apparatus according to claim 3, wherein the internal pattern includes elastic cording located along the lengths of the internal pattern.

5. The apparatus according to claim 4, wherein the internal pattern comprises a plurality of apertures located along the internal pattern.

6. The apparatus according to claim 5, wherein the internal pattern is in the approximate shape of the letter "X".

7. The apparatus according to claim 6, wherein the body is fabricated from a polyethylene material.

8. The apparatus according to claim 7, wherein the body is fabricated from DuPont Tyvek® material.

9. The apparatus according to claim 8, further comprising a plurality of perforated flaps located throughout the body of the apparatus.

10. The apparatus according to claim 9, wherein the body comprises a reflective material.

11. The apparatus according to claim 10, wherein the perimeter comprises a reflective material.

12. Apparatus comprising:
a body including a perimeter located around an outer edge of the body, wherein the body and the perimeter are both configured to be collapsed and folded;
elastic cording that is located throughout the perimeter of the apparatus, wherein the elastic cording is operative to tighten and loosen the perimeter; a plurality of apertures located along the perimeter, wherein the elastic cording is accessible through the plurality of apertures; and
a plurality of removably attachable components comprising:
at least one toggle component;
at least one hook component;
at least one suction component; and
at least one GPS component integrated with a lighting component, wherein the lighting component is configured to operate a flashing SOS pattern in Morse code;
wherein the plurality of removably attachable components are operative to be secured to the elastic cording located throughout the body and the perimeter.

13. The apparatus according to claim 12, wherein the body comprises a rectangular shape.

14. The apparatus according to claim 13, wherein the lighting component comprises a high intensity directional light emitting diode.

15. The apparatus according to claim 14, wherein the body comprises a reflective material.

16. The apparatus according to claim 15, wherein the perimeter comprises a reflective material.

17. The apparatus according to claim 16, wherein the body is fabricated from DuPont Tyvek® material.

18. The apparatus according to claim 17, further comprising a plurality of perforated flaps located throughout the body of the apparatus.

19. Apparatus comprising:
a body including a perimeter located around an outer edge of the body, wherein the body and the perimeter are both configured to be collapsed and folded;
elastic cording that is located throughout the perimeter of the apparatus, wherein the elastic cording is operative to tighten and loosen the perimeter;
a plurality of apertures located along the perimeter, wherein the elastic cording is accessible through the plurality of apertures; and
at least one removably attachable component that is operative to be secured to the body or the perimeter,
wherein the at least one removably attachable component comprises a GPS component that is integrated with a lighting component.

20. The apparatus according to claim 19, wherein the lighting component is configured to generate a flashing SOS light pattern in Morse code.

* * * * *